June 5, 1934.                    C. A. MILLER                 1,961,300
                              DRIVING MECHANISM
                        Original Filed Dec. 29, 1932
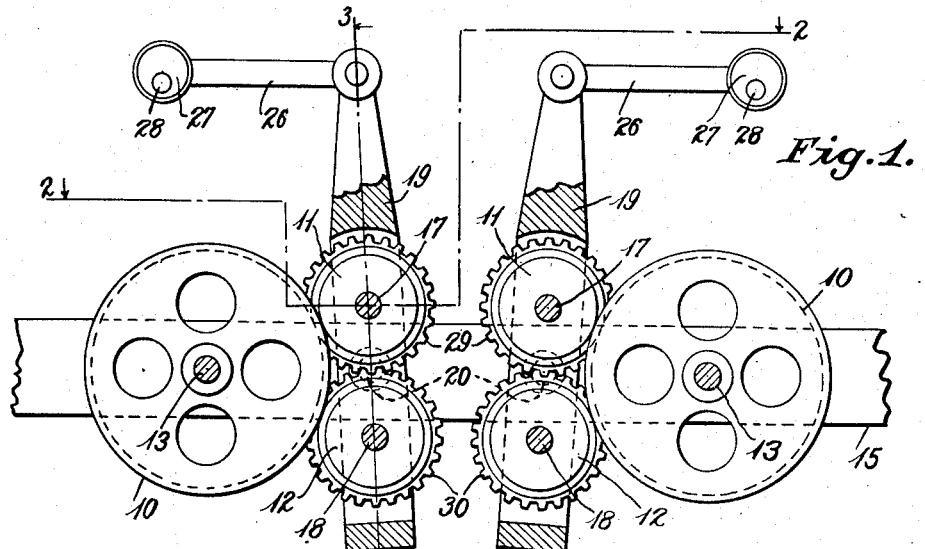
Fig. 1.
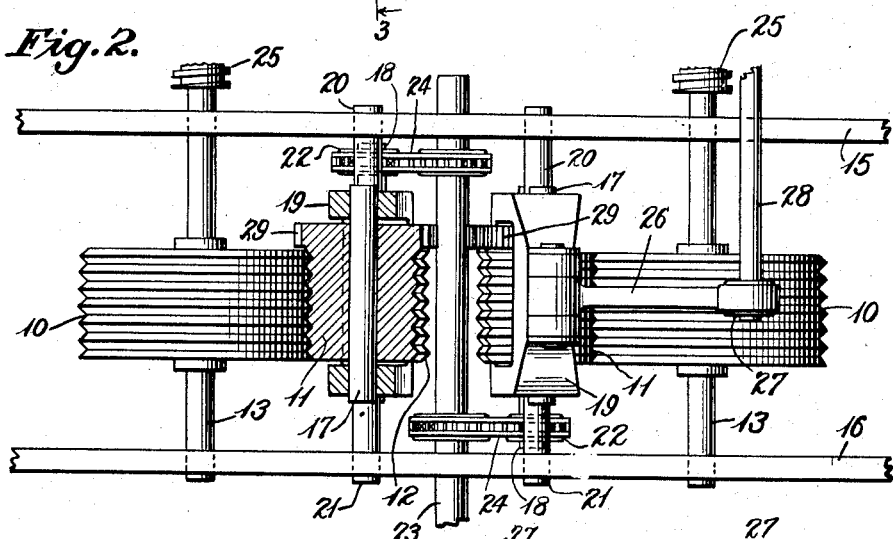
Fig. 2.
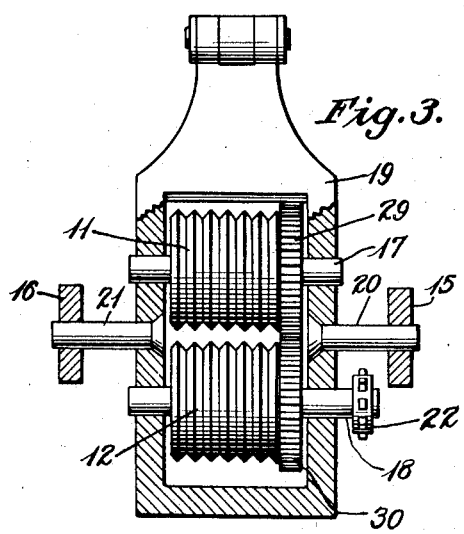
Fig. 3.                                                       Fig. 4.
Inventor
Charles A. Miller
By Browne + Phelps
Attorneys Patented June 5, 1934

1,961,300

UNITED STATES PATENT OFFICE 1,961,300

DRIVING MECHANISM

Charles A. Miller, Weatherly, Pa.

Original application December 29, 1932, Serial No. 649,429. Divided and this application June 23, 1933, Serial No. 677,316

1 Claim. (Cl. 74—190)

The invention relates to mechanical drives and has as an object the provision of mechanism adapted to readily reverse the direction of revolution of the driven part.

It is a further object of the invention to provide a reversible drive for a motor vehicle.

It is a specific object of the invention to provide a mechanism which may be duplicated to drive the separate tread chains of a caterpillar tractor from a single driving shaft in such manner that the device may be readily steered and moreover may be caused to revolve about a central vertical axis by driving the individual chains in opposite directions at the same speed.

This application is a division of my application No. 649,429, filed December 29, 1932.

Further objects of the invention will appear from the following description when read in connection with the accompanying drawing showing an illustrative embodiment of the invention and wherein:—

Fig. 1 is a side elevation partly broken away;

Fig. 2 is a plan view partly in horizontal section on line 2—2 of Fig. 1;

Fig. 3 is a vertical section on line 3—3 of Fig. 1; and

Fig. 4 is a side elevation showing the relation of the mechanism to a driving shaft.

As shown the device comprises similar structures each including a driven drum 10 and a pair of driving drums 11 and 12. The driven drums are each shown mounted upon a shaft 13 mounted in stationary bars 15, 16. The driving drums are shown mounted upon shafts 17, 18 which are journalled in a yoke 19 mounted upon stub shafts 20, 21 which in turn are journalled in the bars 15, 16.

To drive the drums 11, 12, the shaft 18 of each is provided with a sprocket wheel 22, the sprocket wheel upon one of the shafts 18 being at the reverse end from that upon the other shaft 18 in the assembly, as shown in Figure 2.

The driven shaft 23 which may be the shaft of an internal combustion motor or the like is shown as journalled below the mechanism of the invention in Figure 4 and as driving the shafts 18 by means of sprocket chains 24.

The drums 10 may drive the mechanism to which power is to be applied as the chains of a tractor, not shown, by means of worm gears 25, a portion of each of which is shown in Figure 2.

To cause a selected one of the drums 11, 12 to contact with the drum 10, the yoke 19 is shown as connected to a link 26 which in turn is connected to an eccentric 27 fast upon a shaft 28 which shaft 28 may extend within reach of an operator and be provided with levers, not shown, through which the eccentrics 27 may be revolved to manipulate the yokes 19.

To drive the drums 11 from the drums 12, meshing gears 29, 30 are shown rigidly carried with relation to the drums and the shafts 17 and 18 respectively, from which it is apparent that the drums 11 and 12 will revolve in opposite directions. When the drum 12 is in contact with the drum 10, the shaft 13 will revolve in one direction and when drum 11 is in such contact and the drum 12 out of contact, the direction of revolution of shafts 13 will be reversed. When the yoke 19 is in a neutral position, it is obvious that the drums 10 will not be driven, both of the drums 11 and 12 being out of contact with the drum 10. Only a very slight motion is necessary in the yoke 19 to carry out such operation.

It is obvious that the sizes of the drums 11 and 12 may be different from each other without departing from the spirit of the invention although for the particular purpose for which the device was conceived, that is the causing of a caterpillar tractor to revolve about its central vertical axis, it is desired that the reverse action be at the same speed as the forward action when both of the devices are driven from the common shaft 23.

Minor changes may be made in the physical embodiment of the invention within the scope of the appended claim without departing from the spirit thereof.

I claim:

Driving mechanism comprising, in combination: parallel spaced fixed supports; a pair of spaced friction drums between said supports and mounted on parallel shafts journaled in said supports; a pair of yokes pivotally mounted on parallel axes between said drums; pairs of friction drums journaled in said respective yokes symmetrically on opposite sides of said pivots; the drums of said pairs intergeared for revolution in opposite directions; a drive shaft common to said pairs of drums mounted to revolve on an axis parallel with the axes of said drums and laterally offset symmetrically from the common plane of said pivots; a pair of sprocket wheels fixed on said drive shaft; a sprocket chain passing about each of said wheels and each passing about a sprocket wheel on the shaft of one drum of each pair; means to move said yokes about their pivots to bring selected drums of the pairs into contact with one of the first named drums; and means to gear the first named drums to the respective traction means of a vehicle.

CHARLES A. MILLER.